April 2, 1968     M. S. HAYES     3,375,993
ADJUSTABLE CRANK MECHANISM FOR FISHING REELS
Filed Feb. 15, 1966     2 Sheets-Sheet 1
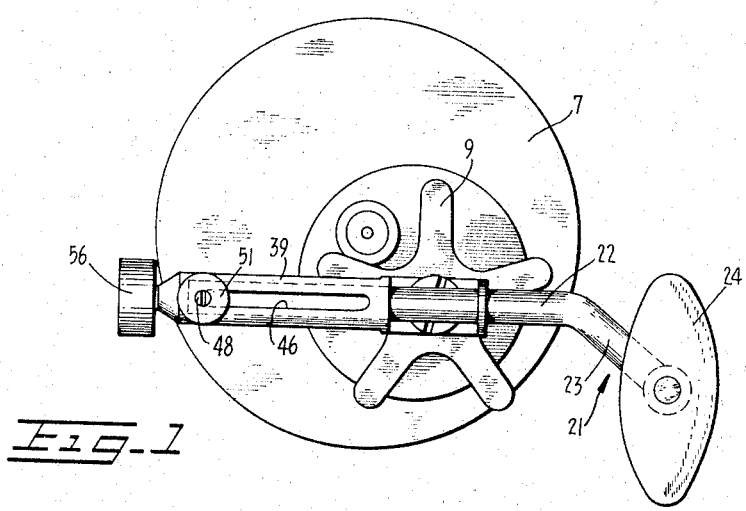
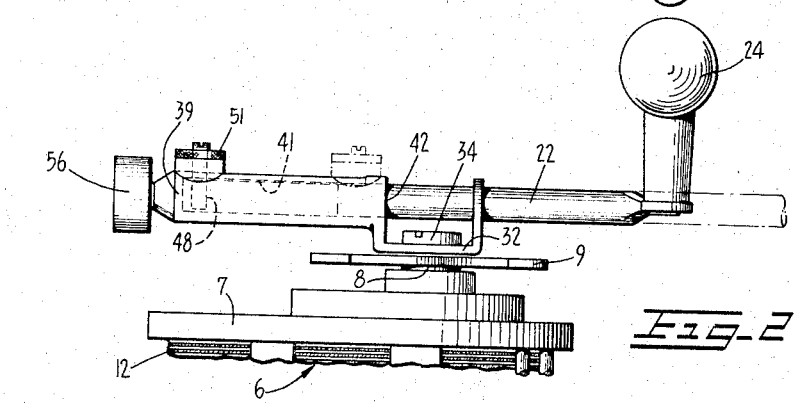
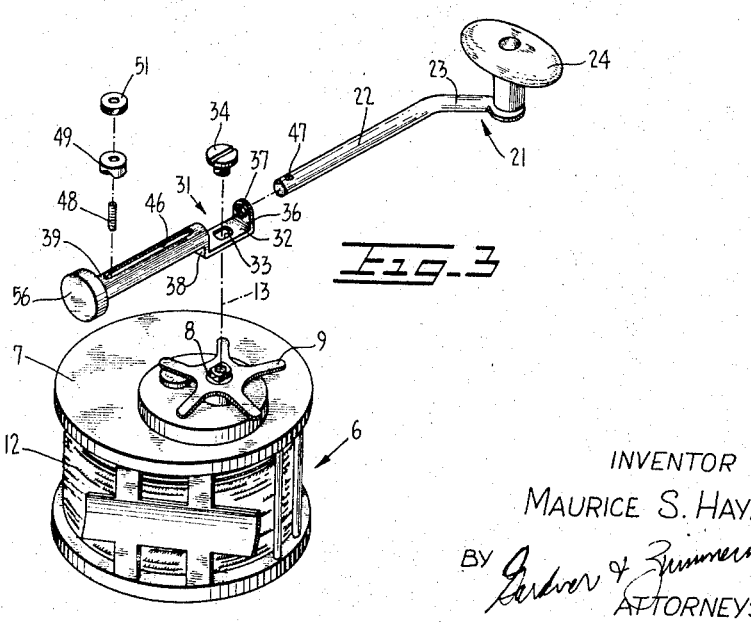
INVENTOR
MAURICE S. HAYES
BY *Gardner & Zimmerman*
ATTORNEYS April 2, 1968
M. S. HAYES
3,375,993
ADJUSTABLE CRANK MECHANISM FOR FISHING REELS
Filed Feb. 15, 1966
2 Sheets-Sheet 2
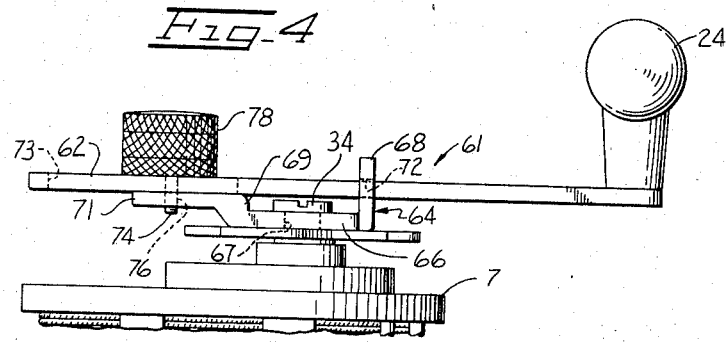
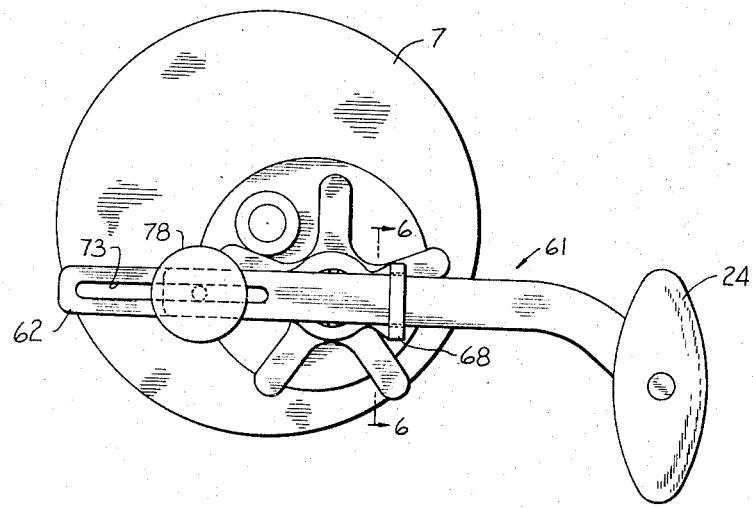
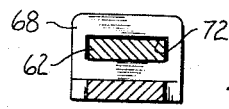
INVENTOR.
MAURICE S. HAYES
BY
ATTORNEYS

United States Patent Office 3,375,993
Patented Apr. 2, 1968

3,375,993
ADJUSTABLE CRANK MECHANISM
FOR FISHING REELS
Maurice S. Hayes, 22142 Thelma St.,
Hayward, Calif. 94541
Continuation-in-part of application Ser. No. 446,354,
Apr. 7, 1965. This application Feb. 15, 1966, Ser.
No. 527,469
8 Claims. (Cl. 242—84.1)

This invention generally relates to fishing reels, and more particularly to the handle or crank mechanism for effecting rotation of the reel about its shaft, and constitutes a continuation-in-part of my prior application, Ser. No. 446,354, filed Apr. 7, 1965 and now abandoned.

The conventional fishing reel, as is well known to those familiar with the sport and with the art, generally comprises a spool mounted on a shaft with suitable gearing interposed between the shaft and spool so that the spool may be caused to rotate in response to shaft rotation. Also, in accordance with usual practice, a crank is connected to and extends outwardly from the shaft, and is provided with a handle, adapted to be manually engaged by the fisherman so as to effect rotation of the shaft. Frequently, particularly when used for heavier fish, the operator has a substantial problem in connection with the reeling in of his line. When the line has been played out, and the user desires to reel in the line without any weight on the line, such as the weight of a trapped fish, the fisherman usually desires to rotate the shaft at the highest possible speed in drawing in the line such as for replacement of bait or the like. This can be accomplished in the simplest manner by having the length of the crank arm, i.e., the distance between the crank handle and the shaft axis kept at a minimum. However, when a fish is hooked, and a substantial drag or force created, too short a crank arm will make it difficult, if not impossible, for the average person to exert sufficient pressure or leverage on the shaft to effect its desired rotation. Consequently, the length of the crank arm in most reels is at best an arbitrary selection, and constitutes a compromise between the two extremes of use to which the reel is subjected.

In the past, there have been suggestions for the use of an adjustable fishing reel crank so that the aforesaid variation in torque or crank arm moment may be varied. However, such devices which are found in the prior art have not been widely accepted for a number of reasons, most of which will be indirectly referred to in connection with the recitation of the following objects of the present invention.

It is an object of the present invention to provide an adjustable crank mechanism for a fishing reel in which the crank arm moment or torque may be readily and selectively varied between an infinite number of positions.

Another and important object of my invention is to provide a crank mechanism as above described which may be readily incorporated on a conventional fishing reel without requiring any modification or alteration of the reel other than to remove the conventional crank arm therefrom.

A further object of the invention is to provide a device of the above character in which the axis of the crank shank or arm is at all times disposed perpendicular to the axis of the reel shaft, and in which said axes are also maintained in intersecting relationship.

A still further object of the invention is to provide a device as hereinabove defined which is simple in construction and in operation and which may be utilized over extended periods of time to accomplish its aforesaid results without maintenance or other operational difficulties.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a side elevational view of a portion of a fishing reel equipped with the crank mechanism of the present invention;

FIGURE 2 is a top plan view of the structure shown in FIGURE 1;

FIGURE 3 is an exploded perspective view of the crank mechanism and its relative positioning on the fishing reel.

FIGURE 4 is a top plan view, similar to FIGURE 2, and illustrating a modified form of crank mechanism.

FIGURE 5 is a side elevational view of the structure shown in FIGURE 4.

FIGURE 6 is a cross-sectional view taken substantially in the plane indicated by line 6—6 of FIGURE 5.

As hereinabove described, the crank mechanism of my invention is adapted for use on a generally conventional type of fishing reel, designated by the numeral 6 in the drawing. Such reel, as is well known to those skilled in the art, comprises a spool 7 which is mounted on a shaft 8. As best shown in FIGURE 3, the shaft 8, on the particular reel illustrated, has generally square outer configuration and an internally threaded bore for receiving a lock screw so as to secure the mechanism together. Such mechanism will also normally include a star drag or star brake 9 which is likewise mounted on the shaft. Suitable gearing (not shown) is used between the shaft and spool so that rotation may be selectively imparted to the spool upon shaft rotation such as to cause rotation of the spool and draw in the fishing line 12 which is wound upon the spool hub.

As above mentioned, when a crank or arm is secured to the shaft 8, the length of such arm from the shaft axis 13 will determine the torque or moment arm and consequently the amount of force required to effect spool rotation against a given load. If this moment arm can be varied, as it is in accordance with the teachings of this invention, the hereinabove defined objects of the invention can be met.

The crank mechanism of the present invention is adapted to be placed on the shaft 8 and secured thereto and as will be presently described in detail, means are provided so that the distance between the manually engageable handle portion of the crank and the shaft axis 13 may be varied.

With particular reference to FIGURE 3 of the drawing, it will be noted that a crank, generally designated at 21, is utilized, the crank having a longitudinally extending shank portion 22, and an off-set shank portion 23 at an end thereof to which a manually engageable knob or handle 24 is pivotally secured. This is a generally conventional type of crank arm which may be found on many forms of fishing reels. In order to connect the crank 21 to the shaft 8, I provide an adaptor 31 which may be placed on said shaft and secured thereto. As here shown, the adaptor is in the form of a yoke, having a flat web portion 32 provided with an aperture 33 therein. The aperture is of a size and shape to receive the shaft 8 of the reel, and by means of an externally tapped machine screw 34, such web is secured to the shaft for unitary rotation therewith. At one end of the web 32 there is provided an upstanding flange 36 having an aperture 37 therein. The other end of the web is likewise provided with an upstanding flange portion 38 which continues into a tubular extension 39 having a bore 41 extending from the face 42 thereof to substantially the distal end of the extension. As best seen in FIGURE 2, the aperture 37 and the bore 41 are in axial alignment so that the crank shank 22 may be readily inserted through the flange 36 and thence into the tubular bore. To prevent relative rotation between the adaptor and the shank, the same could be formed of complementary irregular sections such as square or rectangular, rather than circular, but, as will be presently explained, I have provided other means to prevent rotation between the shank and adaptor, and consequently the same have been shown as circular in cross-sectional form.

It will also be noted from FIGURE 2 that the spacing of the aperture 37 and bore 41 relative to the web 32 is such that even with the screw 34 securing the adaptor in position, the shank may still freely slide through the aperture and bore so as to selectively vary the position of the handle 24 relative to the shaft axis 13.

Means are provided for preventing accidental withdrawal of the crank shank from the extension 39 and for securing the shank in selected positions of axial adjustment along the extension. As illustrated in FIGURES 1 to 3, such extension is provided with a longitudinal slot 46 which extends for substantially the entire length of the extension and which communicates with the bore 41. The end of the shank 22 which is inserted into the bore is provided with a tapped aperture 47 which will, upon insertion of the shank, be in alignment with the slot 46. A threaded pin 48 may then be inserted through the slot and engaged with the tapped hole 47, thereby limiting the axial movement of the shank to the length of the slot, since the pin will serve as a stop member against the respective ends of the slot.

In order to releasably fix the crank, either at the ends of the slot or at any desired intermediate position, I provide a cam member 49 and a knurled nut 51 in the following manner. As will be seen, the cam member 49 is provided with a bore to permit free movement on the pin 48, with the lower surface of such member being curved as best illustrated in FIGURE 3. The nut 51 is threadably engaged with the pin and by moving the same towards the extension, i.e., by cinching up on the nut, the cam will be forced against the extension adjacent the slot and thereby clamp the pin to the extension. Since the pin is secured to the shank, the shank and its attached handle will likewise be thus secured in a desired position of extension or retraction relative to the reel axis. If desired, and as shown, the end of the extension may be provided with a counterweight 56.

FIGURES 4 to 6 illustrate another embodiment of the invention, which in operation and in result is generally identical to the arrangement shown in FIGURES 1 to 3, but which may be more commercially produced.

In this embodiment, the crank, generally indicated by the numeral 61 has its shank portion 62 formed of flat stock or strap, and is likewise provided with the manually engageable handle 24 pivotally attached at an end thereof. An adaptor 64, replacing adaptor 31, includes a flat web portion 66 provided with an aperture 67 therein of a size and shape to receive the shaft 8, and is secured thereto by means of the screw 34. One end of the web 66 has an upstanding flange 68 while the other end is provided with a short upstanding flange 69 which then continues with a flat strap seat 71 disposed in parallel relation to web 66. Flange 68 is provided with an aperture in the form of a slot 72 of a size and shape to freely receive the flat shank 62 for sliding movement therein, the forward end of the shank being disposed on the seat 71.

The shank 62 is provided with a longitudinal slot 73 which overlies the screw 34 and seat 71 and extending through such slot is a screw 74 whose end is received in a tapped bore 76 provided in the seat 71. The other end of the screw is provided with a knurled head 78 so that by tightening the screw, the shank 62 will be forced against seat 71 and prevented from longitudinal movement, while loosening of the screw will permit free movement of the shank through the flange 72 with the opposed surfaces of the shank passing between the seat 71 and the confronting surface of the knurled head 78. Thus, just as in the case of the previously described apparatus, the shank or crank arm and its attached handle may be secured in selected positions of extension or retraction relative to the reel axis.

What is claimed is:

1. An adjustable crank mechanism for a fishing reel having a spool and a shaft provided with an internally threaded end portion extending axially outwardly of said spool, comprising an adaptor member having a flat web provided with an aperture therein of a size and shape to receive said end portion of the shaft with said web extending diametrically of the shaft axis, a flange extending upwardly from one end of said web and substantially normal thereto on one side of said web aperture and provided with an arm-receiving aperture, a longitudinally extending arm having a handle adjacent an end thereof slidably mounted in said flange aperture in intersecting perpendicular relationship to the axis of said shaft and movable between a first position wherein said handle is at a maximum distance from said axis and a second position wherein said handle is at a minimum distance from said axis, said arm being disposed in parallel spaced relation to said web and in spaced relation to said shaft to form chamber means for receiving therein the head of an adaptor mounting screw positioned between said web and said arm when the shank of such screw engages the threaded end portion of said shaft, said adaptor member including supporting means adjacent the other end of said web and on the other side of said web aperture for supporting said arm as the arm is moved through the flange aperture, and securing means interconnecting said supporting means and said arm for releasably holding said arm in said first and second positions of arm movement and at selected arm positions therebetween.

2. Apparatus as set forth in claim 1 in which said handle end of said arm is angularly offset from the longitudinal axis of said arm, and said handle is pivotally attached to such end.

3. Apparatus as set forth in claim 1 in which said securing means includes a threaded member having a manually engageable handle portion extending above said arm.

4. Apparatus as set forth in claim 1 in which said arm supporting means includes a longitudinally extending member having a bore therein in axial alignment with said flange aperture and telescopically receiving said arm.

5. Apparatus as set forth in claim 4 in which said member is provided with a longitudinal slot therein, a pin secured to said arm and extending through said slot for limiting axial movement of the arm to the length of said slot, and means engageable with said pin and with portions of said member adjacent said slot for clamping the pin at selected positions along the slot to thereby position the arm.

6. Apparatus as set forth in claim 1 in which said arm has a generally flat configuration in a plane normal to the shaft axis and said arm supporting means comprises a flat seat extending normal to and intersecting said shaft axis with said arm being slidably engageable with said seat and with the upper surface of said seat lying in a common plane with the lower surface of said flange aperture.

7. Apparatus as set forth in claim 6 in which said arm is provided with a longitudinal slot, a member secured to said seat and extending through said slot, and said securing means including a nut engageable with said latter member for urging the arm into frictional engagement with said seat.

8. Apparatus as set forth in claim 6 in which the aperture in said flange is of complementary cross-section to that of said arm.

References Cited

UNITED STATES PATENTS

| | | | |
|---|---|---|---|
| 250,165 | 11/1881 | Palmer | 242—84.1 XR |
| 1,424,045 | 7/1922 | Sprague | 74—546 |
| 1,499,474 | 7/1924 | Price | 74—546 |
| 2,326,023 | 8/1943 | Fredericksen | 74—546 |
| 2,573,240 | 10/1951 | Berlinger | 242—84.1 |
| 3,011,362 | 12/1961 | Cronholm | 242—84.1 |

BILLY S. TAYLOR, *Primary Examiner.*